May 11, 1926.
J. A. RUTHERFORD
1,583,799
TIRE VULCANIZING MECHANISM
Filed April 24, 1925
3 Sheets-Sheet 1
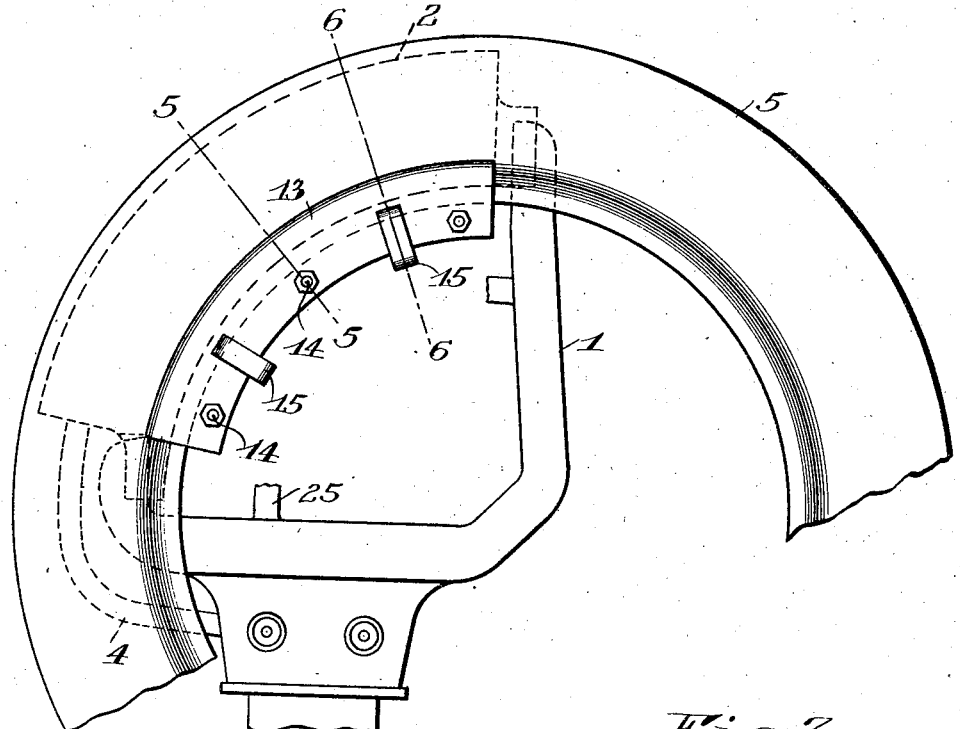
Fig.1
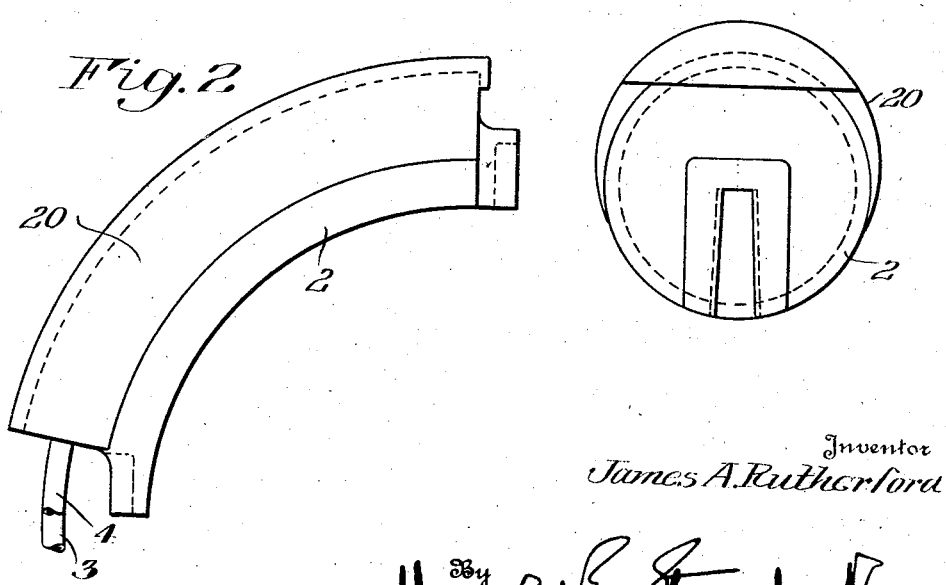
Fig.2
Fig.3
Inventor
James A. Rutherford
By Harold E. Stonebraker
his Attorney May 11, 1926.
J. A. RUTHERFORD
1,583,799
TIRE VULCANIZING MECHANISM
Filed April 24, 1925     3 Sheets-Sheet 2
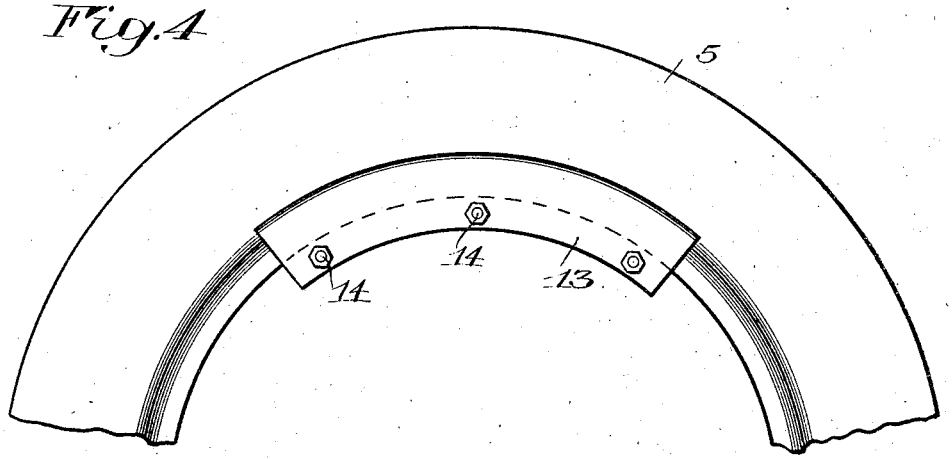
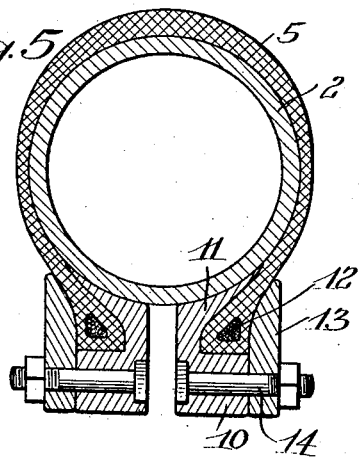
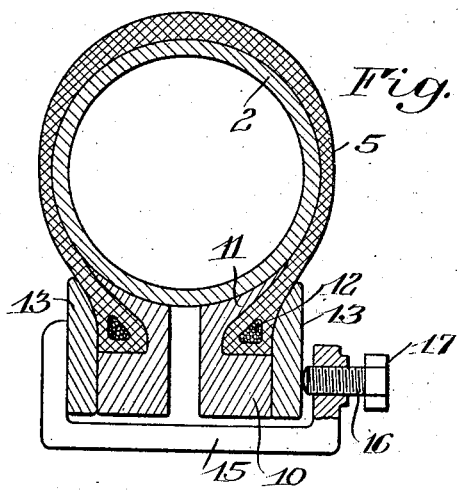
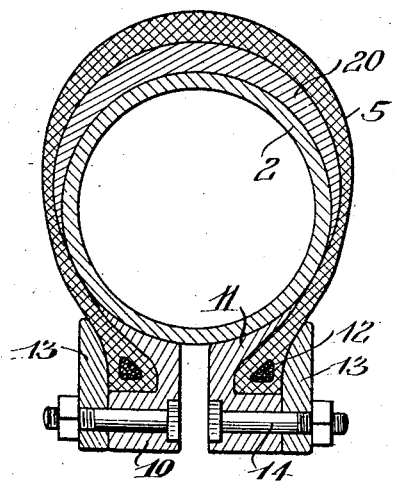
Inventor
James A. Rutherford
By Harold R. Stonebraker
his Attorney

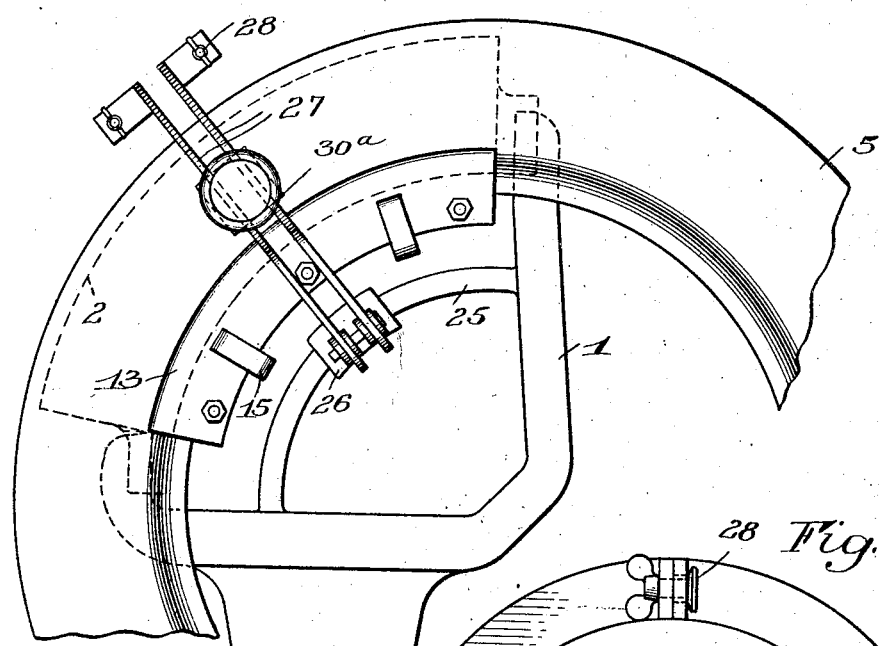
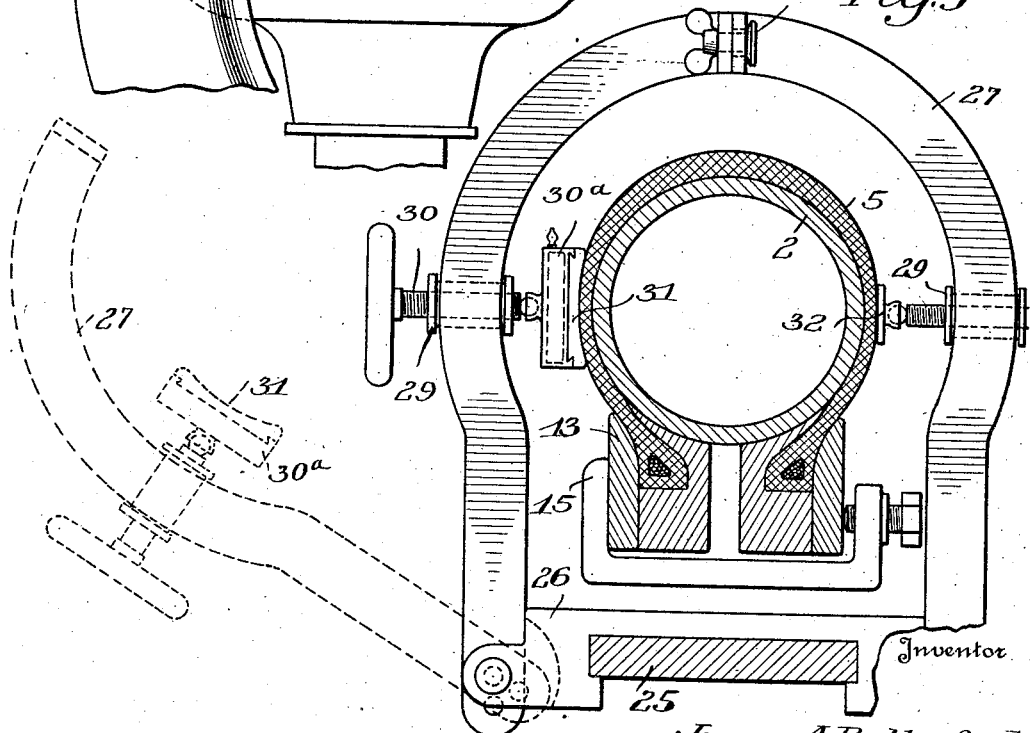

Patented May 11, 1926.

1,583,799

UNITED STATES PATENT OFFICE.

JAMES A. RUTHERFORD, OF ROCHESTER, NEW YORK.

TIRE-VULCANIZING MECHANISM.

Application filed April 24, 1925. Serial No. 25,608.

My invention relates to a tire vulcanizing mechanism, intended more particularly for low pressure and balloon tires and the purpose of the improvement is to afford means for properly supporting a tire so as to prevent breaking or damaging the walls thereof, and at the same time permitting the necessary amount of heat to be distributed evenly throughout the treated portion of the tire at the interior thereof.

A further object of my invention is to afford an apparatus by which a low pressure tire can be subjected to a vulcanizing process while insuring that the tire during such vulcanizing operation, shall retain its normal relationship as when properly inflated.

Another purpose of the invention is to provide readily adjustable and efficient means for vulcanizing a given portion on the exterior or tread portion of the tire.

Still another purpose of the improvement is to provide a structure, applicable to tires of different sizes, and which makes it possible to quickly assemble and clamp a tire accurately for a vulcanizing operation.

An additional object of my invention is to afford a practicable and efficient mechanism comprising few parts, and which can be manufactured at a low cost, making it universally applicable for low pressure tire repair work.

To these ends, the invention comprises the structure that will appear clearly from the following description when read in conjunction with the accompanying drawings, the novel features being pointed out in the claims at the end of the specification.

In the drawings:

Figure 1 is a side view of a portion of a tire vulcanizing outfit, illustrating one embodiment of my invention with a tire in position, the tread vulcanizing parts being removed;

Figure 2 is a side view of the heated core;

Figure 3 is an end view of the same;

Figure 4 is an enlarged side elevation showing the application to the tire of one of the bead gripping members;

Figure 5 is a sectional view on line 5—5 of Figure 1;

Figure 6 is a sectional view on line 6—6 of Figure 1;

Figure 7 is a view similar to Figure 6, illustrating a modification of the invention as applied to a larger sized tire;

Figure 8 is a side elevaton showing the parts for engaging and vulcanizing the tread, and Figure 9 is a transverse sectional view centrally of Figure 8.

The invention may be used advantageously with various types and sizes of tires, although designed more particularly for low pressure and balloon tires in which the side walls are relatively thin and the matter of holding said side walls in proper relationship becomes more serious than with a cord tire or one with stiffer side walls. The invention may be carried out in various practical embodiments, one of which is illustrated in the accompanying drawings.

1 designates a conventional type of core support for a vulcanizing apparatus, and 2 designates a heating core having the usual steam inlet and outlet 3 and 4. The core 2 of my invention is of circular cross-section, as illustrated in Figures 5 to 7, in which 5 designates a tire operatively positioned for a vulcanizing operation. The tire is held in place on the core through the instrumentality of bead gripping members, one of which engages each bead portion of the tire, the bead portions and bead gripping members being drawn toward each other along a line connecting them by suitable clamping means, all of which will now be described.

There are preferably two bead gripping members, which are of duplicate construction so that it will be necessary to describe only one of these. Each bead gripping member comprises an inner portion including a base 10 and an upper tapered portion 11 which are shaped to conform to the bottom and inner surfaces of the bead portion 12 of the tire, the tapered portion 11 occupying the space between the periphery of the core 2 and the inner surface of the bead portion. 13 is the outer portion of the bead gripping member preferably separable from the inner portion and embracing the outer walls of the tire and bead portion. The inner and outer portions of the bead gripping member are held together in rigid engagement with the bead portion by means of suitable bolts 14 or other convenient means for the purpose. The gripping members may be constructed otherwise than as shown, so long as they function to securely grip the bead portions and permit their being drawn toward each other to stretch the tire around the core. The bead gripping members may be heated in any convenient way.

The bead gripping members can be quickly and conveniently attached to the bead portions of the tire before positioning the latter in the vulcanizing machine. After the bead gripping members are securely attached to the bead portions, the tire is then positioned in the machine around the core 2 and suitable clamping means are provided for drawing the bead gripping members toward one another, or moving the bead portions of the tire toward one another in the direction of a line connecting them.

This may be brought about in various ways, as for instance by a U-shaped clamping frame 15, and the clamping screw 16 with an operating head 17. By turning and moving the screw 16 inwardly, the bead gripping members will be forced toward each other tightly, drawing the tire firmly and uniformly around the core 2, so that during the vulcanizing operation, the walls of the tire occupy their normal position as when properly inflated. By this arrangement, I insure against any distortion, creasing, or breaking down of the walls of the tire during the heat treatment, so that after vulcanizing, the contour of the tire remains the same as before, thus adding greatly to the efficiency and durability of vulcanized work.

It is sometimes desirable to use the appliance in connection with tires of different sizes, and with my improvement this can readily be done without changing the bead gripping members or clamping means. It is only necessary to employ a supplemental spacing member as designated at 20 of crescent-shaped cross-section. This removable spacing member can be positioned around the outer periphery of the core 2 and between it and the inner periphery of the tire when positioning the latter upon the core. This takes up the additional space at the interior of a larger sized tire, while the contour of the latter at the bottom remains the same as with a smaller size, and is properly retained by the tapered portions 11 of the bead gripping members.

Figures 8 and 9 illustrate the parts for vulcanizing a portion of the exterior or tread of a tire, comprising a curved bar or slide 25 preferably integral with support 1. 26 is a frame adjustable to any given point on the slide 25. The frame 26 has pivoted thereto the brackets 27 which when adjusted to position straddle the tire and are separably held together by clamping means 28. Slidably arranged on the brackets 27 are carriers 29 each of which has threaded thereon a clamping bolt 30. One of said clamping bolts carries a vulcanizing element which may be in the form of a steam chest 30ª and detachable tire engaging die 31, while the other of said bolts 29 carries a pressure plate 32, adapted to be disposed opposite to the vulcanizing die 31, to equalize the pressure and prevent distortion of the brackets 27.

In operation, the frame 26 is first adjusted along slide 25 until it is opposite the spot to be vulcanized. The brackets 27 are swung outwardly and secured together. Then the vulcanizing die and carrier are adjusted along its bracket 27 until in line with the spot to be vulcanized, and its clamping bolt 30 tightened. After this, the clamping plate is adjusted along its bracket until opposite the vulcanizing plate, and its clamping bolt tightened. The parts are then ready for the vulcanizing operation, and by proper adjustments and tightening of the clamping bolts, the desired pressure can be maintained at the point of vulcanization without distorting or affecting the mechanism or the tire itself.

While I have described the invention with reference to a particular embodiment, it is not to be confined to the details herein set forth, as this application is intended to cover any departures or modifications that may come within the principle of my improvement or the scope of the following claims.

I claim:

1. Tire vulcanizing mechanism comprising a heating core and means for clamping a tire around the core comprising a gripping member engaging both sides of each of the bead portions of the tire, and devices for drawing said gripping members toward each other.

2. Tire vulcanizing mechanism comprising a heating core and means for clamping a tire around the core comprising a bead gripping member engaging the inner and outer surfaces of the tire and conforming to the bead portion, and means for drawing said gripping members toward each other.

3. Tire vulcanizing mechanism comprising a heating core of circular cross-section, and means for holding a tire on the core comprising a pair of bead gripping members, each of which includes an inner portion embracing the inner wall of the tire and occupying the space between the core and the bead portion, and an outer portion embracing the outer wall of the tire, and means for drawing the gripping members toward each other.

4. Tire vulcanizing mechanism comprising a heating core of circular cross-section, and means for holding a tire on the core comprising a pair of bead gripping members, each of which includes an inner portion having a tapered part embracing the inner wall of the tire on one side and the core on the other side, and an outer portion embracing the outer wall of the tire, said inner and outer portions conforming to the bead portion of the tire, and a clamp engaging the outer surfaces of the gripping members and acting to draw them together.

5. Tire vulcanizing mechanism comprising a fixed support, a frame adjustable along the support, a bracket carried by the frame, and vulcanizing means adjustable on the bracket and adapted to be clamped against a tire.

6. Tire vulcanizing mechanism comprising a fixed support, a frame adjustable along the support, a pair of brackets carried by the frame and adapted to straddle a tire, vulcanizing means adjustable on one of said brackets and adapted to be clamped against a tire, and a clamping plate adjustable on the other bracket to a point opposite the vulcanizing means.

7. Tire vulcanizing mechanism comprising a fixed arcuate support, a frame adjustable along the support, a pair of brackets carried by the frame and adapted to straddle a tire, vulcanizing means adjustable on one of said brackets and adapted to be clamped against a tire, and a clamping plate adjustable on the other bracket to a point opposite the vulcanizing means.

In witness whereof, I have hereunto signed my name.

JAMES A. RUTHERFORD.